US005362938A

United States Patent [19]

McGee et al.

[11] Patent Number: 5,362,938

[45] Date of Patent: Nov. 8, 1994

[54] PLASMA ARC WELDING TORCH HAVING MEANS FOR "VORTEXING" PLASMA GAS EXITING THE WELDING TORCH

[75] Inventors: William F. McGee, Decatur; Daniel J. Rybicki, Huntsville, both of Ala.

[73] Assignee: The United States of America as represented by the Administrator of the National Aeronautics and Space Administration, Washington, D.C.

[21] Appl. No.: 158,327

[22] Filed: Nov. 29, 1993

[51] Int. Cl.[5] .......................... B23K 9/00; B23K 10/00

[52] U.S. Cl. .......................... 219/121.51; 219/121.49; 219/121.45; 219/121.48; 313/231.51

[58] Field of Search ...................... 219/121.51, 121.52, 219/121.48, 121.5, 121.49, 76.16, 75, 121.45; 313/231.31, 231.41, 231.21, 231.51

[56] References Cited

U.S. PATENT DOCUMENTS

| | | | |
|---|---|---|---|
| 3,813,510 | 5/1974 | Hatch | 219/121.52 |
| 4,127,760 | 11/1978 | Meyer et al. | 219/76.16 |
| 4,701,590 | 10/1987 | Hatch | 219/121.52 |
| 5,247,152 | 9/1993 | Blankenship | 219/121.49 |

*Primary Examiner*—Mark H. Paschall

*Attorney, Agent, or Firm*—Robert L. Broad, Jr.; Guy M. Miller; Alan J. Kennedy

[57] ABSTRACT

A plasma arc welding torch wherein a plasma gas is directed through the body of the welding torch and out of the body across the tip of the welding electrode disposed at the forward end of the body. The plasma gas is provided with a vortexing motion prior to exiting the body by a vortex motion imparting member which is mounted in an orifice housing member and carried in the forward portion of the torch body. The orifice housing member is provided with an orifice of an predetermined diameter through which the electric arc and the plasma gas exits.

13 Claims, 2 Drawing Sheets

PLASMA ARC WELDING TORCH HAVING MEANS FOR "VORTEXING" PLASMA GAS EXITING THE WELDING TORCH

This invention was made with government support under contract NAS8-36200 awarded by the National Aeronautics and Space Administration. The Government has certain rights in this invention.

FIELD OF THE INVENTION

This invention relates generally to plasma arc welding torches and more particularly to plasma arc welding torches having means to provide a swirling or vortexing motion to the plasma gas as the plasma gas exits the torch body. Such motion provides a well defined arc column between the torch electrode and the workpiece.

BACKGROUND OF THE INVENTION

Plasma arc welding is generally accomplished by placing a welding torch adjacent a workpiece and directing an inert gas across the tip of an electrode provided in the torch body and onto a workpiece. The interaction of the inert gas and hot electrode forms a substantially constricted arc between the tip of the electrode and the workpiece.

In a typical plasma arc welding torch, the electrode is comprised of a refractory material and is mounted in the torch body in thermally and electrically insulated relation therewith. The electrode is enclosed by the torch body and includes a tip positioned in the forward portion of the torch body. The tip is in spaced relation with an exit orifice in the forward portion of the torch body and an electric arc and an inert plasma gas exits the body through this exit orifice to engage the workpiece.

The inert gas (defined herein as orifice gas) acts upon the electric arc present between the electrode and the workpiece to constrict its shape to that of a narrow column. The orifice gas also provides the necessary atmosphere which allows for electrical transfer of the arc across the gap formed between the electrode and the workpiece. In addition, this inert (orifice) gas provides some shielding effect to the molten weld zone as well as penetration control of the arc, depending on the volume of plasma gas flowing through the torch body. However, typically, a greater shielding effect is required and is accomplished by directing additional inert gas (defined herein as shield gas) around the outer surface of the orifice member and across the orifice thereof to provide a total inert atmosphere at the weld zone. This additional inert shield gas may be the same type of inert gas and received from the same source as the plasma gas, if desired. Or, the additional shield gas may be a different or same gas received from a second inert gas source, if desired.

The quality of the constricted plasma arc column depends on the type of inert gas used as the orifice gas, the tip configuration of the electrode, the size, shape and condition of the constricting orifice and the volume of inert gas directed through the orifice.

It has been found, however, that the orifice gas can more effectively concentrate the arc into a denser and more narrow energy column if the orifice gas were provided with a swirling or vortexing motion as it coacts with the arc. This swirling motion allows for a more narrow weld bead and Heat Affected Zone (HAZ) as well as aiding in maintaining symmetry of the dimensional shape of the arc, thereby substantially eliminating asymmetrical weld bead shapes and related defects due to the same. The continuous circular motion imposed upon the arc by the vortexing thereof also decreases electrode and orifice degradation allowing the electrode and orifice to maintain a uniform configuration, thus eliminating arc asymmetry during long duration welding processes. Averting arc asymmetry also permits the torch to be less operator dependent and reduces or eliminates the need for torch rotation during welding.

The vortexing action of the orifice gas is achieved in the torch of the present invention by providing a swirl ring in the body of the torch. The swirl ring is mounted in an orifice housing member removably secured in the forward portion of the torch body. The orifice housing member is positioned around the electrode adjacent the forward portion thereof and also supports the electrode intermediate the ends thereof and forces the orifice gas passing through the torch body to be directed to an exit orifice of the orifice housing member through a plurality of channels provided on the outer annular peripheral surface of the swirl ring. The channels terminate and mate with angled internal passages provided in the end of the swirl ring to provide the vortexing or swirling motion to the gas at a position adjacent the gas exit orifice of the orifice housing member.

It is, therefore, an object of the present invention to provide an improved plasma arc welding torch.

It is a further object of the present invention to provide such a plasma arc welding torch with an arc shaping device which will maintain symmetry of the electric welding arc and thereby substantially reduce the possibility of asymmetrical weld bead shapes and other related defects which result from asymmetrically shaped arcs.

It is yet a further object of the present invention to provide the torch with such an arc shaping device which may be assembled in and disassembled from the torch body in a rapid and facile manner.

It is still yet another object of the present invention to provide such a welding torch with means for producing a vortexing motion to the inert as the gas leaves the body of the torch whereby the vortexing provides the arc shaping to the electric welding arc.

DESCRIPTION OF THE PREFERRED EMBODIMENT

Figure 1:
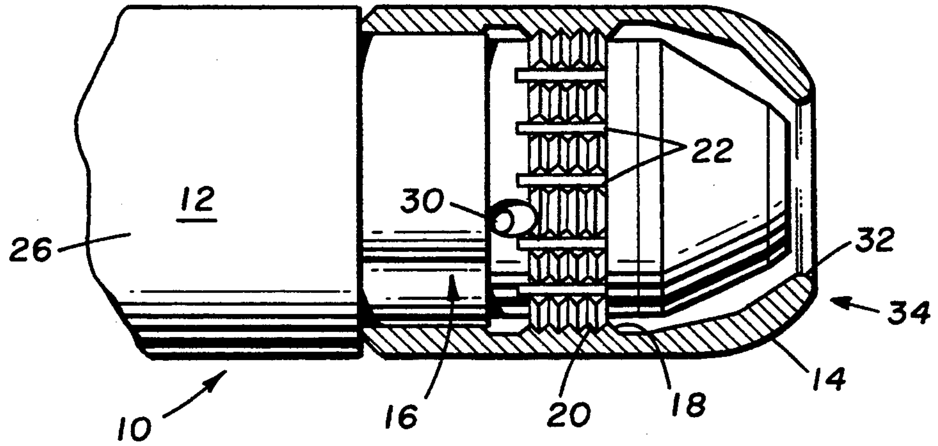
FIG. 1 is a side elevational view of the torch head of the present invention. The torch head is shown to be provided with external threads onto which a shielding gas cup is threadably secured. The shielding gas cup is shown in dot-dash lines so that the grooved external threading of the torch body may be better illustrated.
Figure 2:
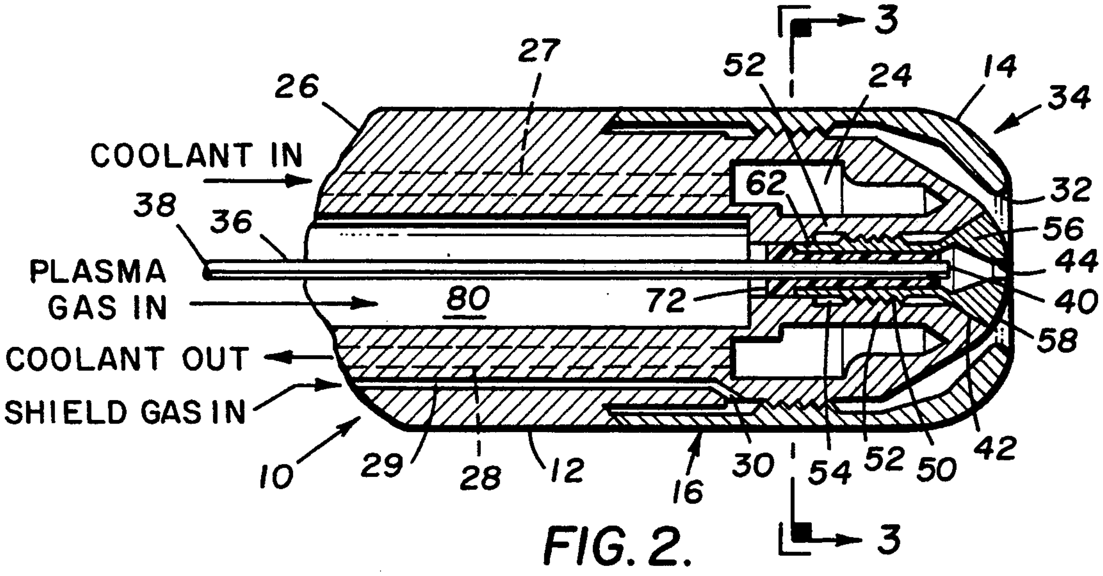
FIG. 2 is a partial longitudinal sectional view of the welding torch body of the present invention.
Figure 3:
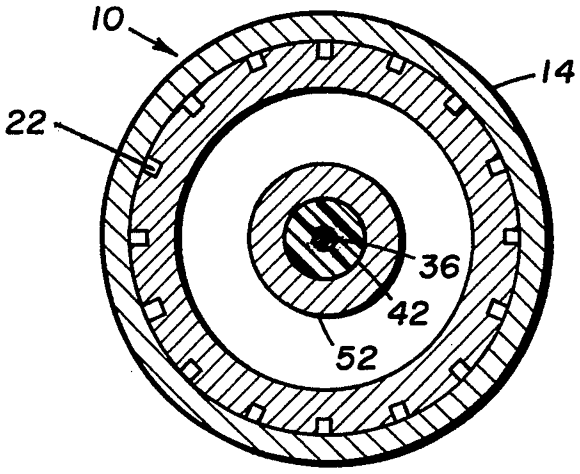
FIG. 3 is a sectional view taken along line 3—3 of FIG. 2.

As seen in FIGS. 1 and 2, a plasma arc welding torch 10 includes a body 12 having a shielding gas cup 14 disposed around the forward portion 16 thereof. Cup 14 includes internal threads 18 which threadably engage external threads 20 provided on the forward portion of the body. The external threads 20 are provided with grooves 22 (FIG. 1) transversely there across for reasons explained hereinbelow.

As seen in FIG. 2, the forward portion 16 of body 12 is provided with an annular cooling chamber 24 through which a coolant, such as water, is circulated. The water enters chamber 24 through a passage 27 provided in an aft portion 26 of body 12 and communicating with channel 24. The water exits the chamber 24 through a passage 28 provided in the aft portion 26 of the body and disposed in communication with channel 24. In like manner, a shield gas passage 29 is provided in the aft portion 26 of body 12 to direct a shield gas from a source (not shown) to the external surface of the forward portion 16 (head) of torch 10. The shield gas flows through the passages 29 and exits the torch body through an orifice 30 positioned adjacent to and on the aft side of threads 20. The shield gas is directed through grooves 22 in threads 20 for flow around the forward portion (head) of the torch. The shield gas is maintained in contact with the torch head by cup 14 as the gas is continuously flowed over the head and exits cup 14 through an opening 32 in the forward end 34 thereof.

Figure 6:
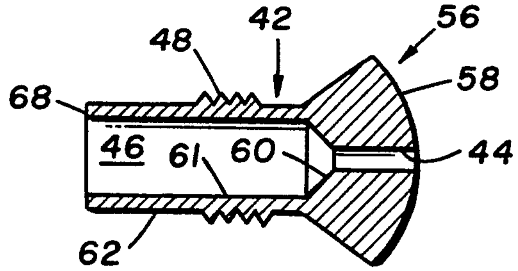
FIG. 6 is an enlarged sectional view of the orifice member shown in FIG. 1.

As can be seen in FIG. 2, an elongated electrode 36 is mounted in the torch body 12 and includes one end 38 which is disposed for connection with a source of electrical power (not shown). The electrode 36 includes a second end 40 which terminates inside an orifice housing member 42 adjacent a central orifice 44 thereof. The orifice housing member 42 (more clearly seen in FIG. 6) includes a body 46 having an externally threaded portion 48 for threaded engagement with internal threads 50 (FIG. 2) provided on an internal annular wall 52 of an opening 54 provided in the forward portion 16 of body 12 (FIG. 1). As seen in FIG. 6 orifice housing member 42 includes a forward portion 56 having an arcuate outer surface 58 and an angled internal surface 60 which is angled forwardly and inwardly from the inner surface 61 of a rear cylindrical portion 62 toward the central orifice 44. The angular disposition of the internal surface 60 aids in providing a swirling motion to the inert orifice gas as will be seen hereinbelow.

Figure 4:
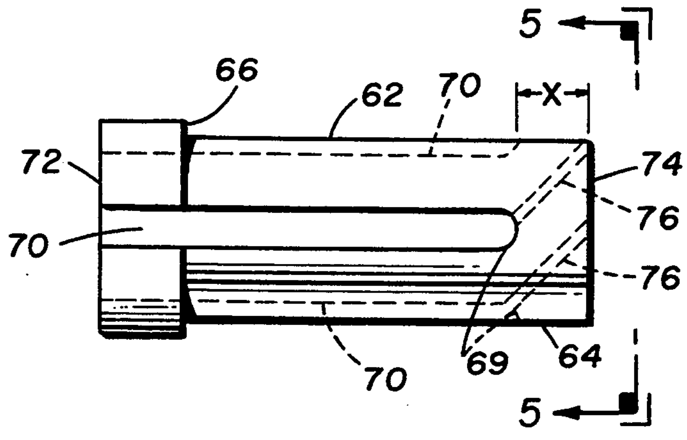
FIG. 4 is an enlarged elevational view of the swirl ring device of the present invention which imparts a swirling motion to the plasma arc exiting the torch body. The swirl ring device is illustrated in the assembly view of FIG. 1.

A swirl ring 62 is disposed for mounting in orifice housing member 42 as shown in FIG. 1. The swirl ring serves to direct plasma gas out of orifice 44 of member 42 in a swirling motion. The swirl ring is more clearly seen in FIGS. 4 and 5 which are, respectively, side and end views of the swirl ring. As seen in FIG. 4, the swirl ring 62 includes a forward end portion 64 and an aft end portion 66. Aft end 66 is provided with a larger diameter than forward end 64 and forms a shoulder 66 which is disposed for abutting relation with an aftmost surface 68 (FIG. 6) of orifice housing member 42 when the swirl ring is mounted in the orifice member as is shown in FIG. 2.

Figure 5:
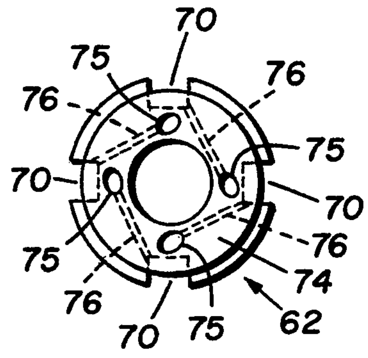
FIG. 5 is an end view of the swirl ring device as seen along line 5—5 of FIG. 4.

The swirl ring 62 is shown in FIG. 4 to be provided with four equally spaced longitudinal channels or grooves 70. Grooves 70 extend from the aft surface 72 of aft portion 66 to a position which is spaced from the forward surface 74 of forward end portion 64 of the swirl ring. The spacing is designated by the letter "X". A plurality of passages 76 are drilled (or otherwise provided) in the forward portion 64 of the swirl and extend from the distal end 69 of grooves 70 to the forward surface 74 of the forward portion of the swirl ring. As can be seen in FIGS. 4 and 5, each of the passages 76 exit the forward surface 74 at a position which is substantially in alignment with the next adjacent longitudinal passage. FIG. 5 also illustrates the shape of the passages 76 at the point where the passages exit the forward surface 74. As can be seen in FIG. 5, surface 74 is provided with grooves 75 at each point of intersection of passages 76 and forward surface 74, the grooves 75 are substantially radially disposed in forward surface 74 and aid in shaping the path of the plasma gas for flow in the desired direction and in providing the swirling motion thereto.

In operation, an inert (orifice) gas enters the body 12 through a passage 80 provided in the body 12 and is directed onto the aft surface of 72 of swirl ring 62 and through the orifice housing member 42 and out of orifice 44 by being channelled through grooves 70 and angled internal passages 76. Responsive to exiting passages 76, the gas has a swirling motion imparted thereto. The swirling motion is further enhanced by the angled grooves 75 on the end surface 74 and the angled surface 60 of the orifice housing member 42. Of course, during the welding process, the welding torch head is encompassed by the inert shield gas and is cooled by the circulating coolant, as described above.

Figure 7:
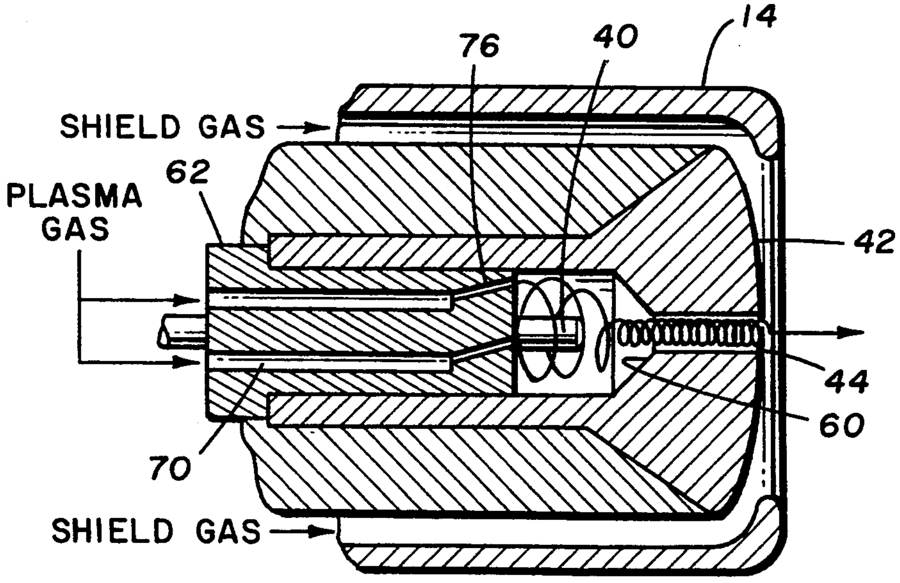
FIG. 7 is an elevational diagrammatic view of the torch body utilizing the principles of the present invention. The vortexing action of the plasma gas is illustrated.

FIG. 7 is a diagrammatic elevational view and is provided to illustrate the swirling motion of the orifice gas around the electrode tip 40 in the orifice housing member 42. The view also illustrates the enhancing effect that the inner angled surface 60 of orifice housing member 42 provides to the swirling motion of the orifice gas as the inner angled surface 60 aids in directing the plasma gas to the orifice 44.

It is to be understood that the swirl ring is preferably removably carried in the orifice member and that the orifice member is preferably removably carried in the forward portion of the torch body. Such assembly permits rapid and facile removal of these components from the torch body to facilitate the cleaning or replacement thereof.

It is to be further understood that although a specific construction has been discussed herein, it is for illustrative purposes only and various modifications and advantages will be readily apparent to those skilled in the art. For example, while four gas channels are disclosed for the swirl ring, more or less channels may be used, as desired. In any event, the scope of the present invention should be determined by reference to the claims appended hereto.

We claim:

1. A plasma arc welding torch comprising:

a body having aft and forward end portions;

an electrode supported in said body, said electrode having an aft portion and a forward portion including a tip, said electrode disposed for producing an electric arc from said tip;

first passage means provided in said body and disposed for directing an inert gas across said tip of said electrode;

vortexing means positioned around said forward portion of said electrode adjacent said tip to provide a vortexing motion to said inert gas and to direct the vortexing of said inert gas around said tip of said electrode, said vortexing means being defined as a swirl ring, said swirl ring having a central chamber therein to receive said electrode, said swirl ring disposed for supporting engagement with said electrode intermediate said aft and forward portions thereof, said swirl ring including an aft shoulder forming portion, an intermediate portion and a forward portion including a forward end surface, said aft and intermediate portions having an outer surface provided with a plurality of common channels disposed therein, said channels terminating in said forward portion at a predetermined distance from said forward end surface, said forward portion of said swirl ring being provided with a like plurality of holes extending therethrough, each hole of said like plurality of holes having first and second ends, said first end communicating with a corresponding one of said like plurality of channels and said second end opening through said end surface of said rings; and orifice housing means mounted in said forward portion of said body, said.. Orifice housing means disposed for receiving the vortexing said gas from said vortexing means and having an orifice therein for directing the vortexing said gas and said electric arc out of said torch body.

2. A plasma arc welding torch as set forth in claim 1 wherein said orifice housing member is carried in said forward portion of said body and disposed for housing said swirl ring and said forward end portion of said electrode therein.

3. A plasma arc welding torch as set forth in claim 2 wherein said orifice housing member is provided with a forward portion and a rear portion including a rear end surface, said rear portion having a cylindrical configuration provided with an annular internal wall disposed for mating, substantially snug fitting relation with said outer surface of said swirl ring, said rear end surface of said orifice member disposed for abutting relation with said shoulder of said swirl ring, responsive to assembly of said swirl ring in said orifice housing member.

4. A plasma arc welding torch as set forth in claim 3 wherein said forward portion of said orifice housing member is provided with an internal angled surface, said internal angled surface extending forwardly and inwardly from said internal annular wall of said housing member, said internal angled surface disposed for enhancing the vortexing motion of said inert gas and for directing the vortexing said inert gas toward said orifice of said orifice member.

5. A plasma arc welding torch as set forth in claim 3 wherein said forward end surface of said swirl ring is provided with a plurality of angled grooves therein, said grooves being angled substantially radially outwardly from said holes in said swirl ring to enhance the swirling motion of said inert gas responsive to said gas exiting said holes.

6. A plasma arc welding torch as set forth in claim 5 including shielding gas means for providing a shielding effect at said forward portion of said torch body to and thus provide an inert atmosphere at the weld zone.

7. A plasma arc welding torch as set forth in claim 6 including a shield member positioned around said forward portion of said body for retention of said shielding gas means in contact with said forward portion of said body, and passage means provided in said body to direct said shielding gas means between the outer surface of said forward portion of said body and said shield member.

8. A plasma arc welding torch as in claim 7 including cooling means disposed in said body and disposed for communication with a coolant source for providing a cooling effect to said forward portion of said body.

9. A plasma arc welding torch as set forth in claim 8 wherein said cooling means is defined by an inner annular cooling chamber in said forward portion of said body and passage means extending from said rear portion of said body to said cooling chamber, said passage means disposed for connection to said coolant source for directing coolant into and out of said cooling chamber.

10. A plasma arc welding torch as set forth in claim 9 wherein said orifice housing means is carried in said forward portion of said torch body in removably secured relation therewith.

11. A plasma arc welding torch as set forth in claim 10 wherein said vortexing means is removably carried in said orifice housing means.

12. A plasma arc welding torch as set forth in claim 11 wherein said body is provided with a central internally threaded bore in said forward portion thereof and said orifice housing member is provided with external threads thereon for threaded engagement with said internal threads to provide the removably secured relation of said orifice housing member in said forward portion of said body.

13. A plasma arc welding torch comprising:

a body having aft and forward end portions;

an electrode supported in said body, said electrode having an aft portion and a forward portion including a tip, said electrode disposed for producing an electric arc from said tip;

orifice housing means mounted in said forward portion of said housing in enclosing relation with said electrode tip, said orifice housing means including a forward portion having an internal and an external surface;

first and second discrete passage means provided in said body, said first passage means disposed for directing an inert plasma forming gas across said tip of said electrode, said second passage means disposed for directing a cooling gas across said external surface of said orifice housing means;

vortexing means positioned around said forward portion of said electrode adjacent said tip, said vortexing means being defined as a single member having a plurality of longitudinal channels therein, a like plurality of angled openings in an end thereof, and a like plurality of passages connecting said channels and said like plurality of openings whereby said inert plasma gas is sequentially directed through said channels, said passages, and said openings to said tip of said electrode in a vortexing movement to produce an electric arc; and said orifice housing means having an orifice therein for directing said electric arc out of said torch body, and, vortexing enhancing means for enhancing the vortexing action of said gases across said tip to aid in producing an electric arc having a dense, narrow energy column, said vortex enhancing means being defined by said internal surface of said forward portion being angled toward said orifice of said orifice housing means to direct the vortexing said gases thereto.

* * * * *